(12) United States Patent
Crozier et al.

(10) Patent No.: US 11,523,706 B2
(45) Date of Patent: Dec. 13, 2022

(54) BEVERAGE PREPARATION APPARATUS WITH BEVERAGE DRAINING MEANS

(71) Applicant: SOCIETE DES PRODUITS NESTLE S.A., Vevey (CH)

(72) Inventors: Etienne Crozier, La Neuveville (CH); Guillaume Heisel, Bienne (CH); Marco Magatti, Lausanne (CH); Damien Romand, La Neuveville (CH); Jean-Luc Thuliez, Le Landeron (CH)

(73) Assignee: Societe des Produits Nestle S.A., Vevey (CH)

( * ) Notice: Subject to any disclaimer, the term of this patent is extended or adjusted under 35 U.S.C. 154(b) by 550 days.

(21) Appl. No.: 16/604,063

(22) PCT Filed: Apr. 9, 2018

(86) PCT No.: PCT/EP2018/058966
§ 371 (c)(1),
(2) Date: Oct. 9, 2019

(87) PCT Pub. No.: WO2018/189070
PCT Pub. Date: Oct. 18, 2018

(65) Prior Publication Data
US 2021/0127892 A1    May 6, 2021

(30) Foreign Application Priority Data
Apr. 11, 2017  (EP) ..................................... 17165972

(51) Int. Cl.
*A47J 31/46* (2006.01)
*A47J 31/58* (2006.01)
(Continued)

(52) U.S. Cl.
CPC .............. *A47J 31/58* (2013.01); *A47J 31/005* (2013.01); *A47J 31/407* (2013.01); *A47J 31/461* (2018.08);
(Continued)

(58) Field of Classification Search
CPC ...... A47J 31/461; A47J 31/462; A47J 31/465; A47J 31/468; A47J 31/469
(Continued)

(56) References Cited

U.S. PATENT DOCUMENTS 3,187,663 A * 6/1965 McLean, Jr. .......... A47J 31/106
                                                     210/485
4,583,449 A * 4/1986 Dangel ............... A47J 31/4496
                                                      99/302 R
(Continued)

FOREIGN PATENT DOCUMENTS

| CN | 201052087 Y | 4/2008 |
| CN | 203388696 U | 1/2014 |
| CN | 104000492 A | 8/2014 |

Primary Examiner — Reginald Alexander
(74) Attorney, Agent, or Firm — K&L Gates LLP

(57) ABSTRACT

Beverage preparation apparatus for preparing a beverage comprising: —a water tank (2) for storing water, —a brewing unit (3) for receiving a dose of beverage ingredients, —a water line (5) for supplying water from the water tank to the brewing unit (3) including a pressure pump (4) for supplying pressurized liquid to the brewing unit and a fluid heater (29) for heating liquid, —a control unit (6) for selectively controlling the activation of the pressure pump, wherein it further comprises a fluidic interrupter (7) positionable in fluidic interruption position for interrupting the fluidic communication between the water tank (2) and the water line (5) and, reversely, positionable in fluidic communication position for restoring the fluid communication between the water tank and the water line and wherein the control unit (6) is arranged for automatically activating an anti-freeze mode by
(Continued)

activating the fluidic interrupter (7) in fluidic interruption position and by running the pressure pump (4) to at least partially empty the water line (5) from water contained therein.

16 Claims, 6 Drawing Sheets

(51) Int. Cl.
*A47J 31/52* (2006.01)
*A47J 31/00* (2006.01)
*A47J 31/40* (2006.01)
*A47J 31/54* (2006.01)

(52) U.S. Cl.
CPC ........... *A47J 31/462* (2013.01); *A47J 31/468* (2018.08); *A47J 31/469* (2018.08); *A47J 31/525* (2018.08); *A47J 31/542* (2013.01); *A47J 2202/00* (2013.01)

(58) Field of Classification Search
USPC .................................................. 99/300, 302 P
See application file for complete search history.

(56) References Cited

U.S. PATENT DOCUMENTS

| | | | | |
|---|---|---|---|---|
| 7,861,644 | B2 * | 1/2011 | Ghassemlou | A47J 31/469 |
| | | | | 99/302 R |
| 8,176,839 | B2 * | 5/2012 | Morgandi | A47J 31/56 |
| | | | | 99/302 R |
| 9,974,412 | B2 | 5/2018 | Kollep | |
| 10,595,670 | B2 | 3/2020 | Lagouche et al. | |
| 2004/0149139 | A1 | 8/2004 | Kollep | |
| 2007/0039477 | A1 | 2/2007 | Bowden et al. | |
| 2009/0029021 | A1 | 1/2009 | Nielsen et al. | |
| 2010/0229728 | A1 * | 9/2010 | Kiefer | A47J 31/36 |
| | | | | 99/302 R |
| 2010/0266740 | A1 * | 10/2010 | Van Den Aker | A47J 31/36 |
| | | | | 99/302 R |
| 2014/0352545 | A1 | 12/2014 | Cahen et al. | |
| 2016/0016129 | A1 | 1/2016 | Vermeulen et al. | |

* cited by examiner

BEVERAGE PREPARATION APPARATUS WITH BEVERAGE DRAINING MEANS

CROSS REFERENCE TO RELATED APPLICATIONS

The present application is a National Stage of International Application No. PCT/EP2018/058966, filed on Apr. 9, 2018, which claims priority to European Patent Application No. 17165972.5, filed on Apr. 11, 2017, the entire contents of which are being incorporated herein by reference

FIELD OF THE INVENTION

The invention relates to the field of beverage preparation in a beverage preparation apparatus using capsules containing ingredients. More particularly, the invention relates to an apparatus for use in vehicles such in a car for example.

BACKGROUND OF THE INVENTION

The beverage preparation apparatus using capsules containing beverage ingredients such as ground coffee are very popular for their convenience, the consistent quality and quick preparation.

Certain beverage machines have been developed more specifically for being installed in vehicles such as the one described in EP1277428B1. The device is an espresso coffee machine designed for a vehicle using a low power source, comprising a reservoir for the water which is connected to a pump to convey water to a heating element, which itself is connected to an extraction head for a portion of coffee, a mobile fastener for the head with a means which makes it possible to displace the said fastener from a position of opening to a position of closure and vice versa.

A problem for the use of a beverage machine in a vehicle is that the fluid circuit of the machine can freeze when the machine is not in use and the vehicle is parked under winter conditions. The ice may damage certain components of the machine such as the fluid circuit including the pump, fluid tubes and the tubular fluid heater. The maintenance of the fluid circuit under positive temperature by heating or continuous water fluidic recirculation cannot be envisioned for long as this would consume too much electrical power from the energy accumulator of the vehicle when the vehicle is parked.

The present invention aims at solving the inconvenient of the prior art by proposing a simple reliable solution that resolves the problem of water freezing in the fluid circuit of the device and a solution that does not require much electrical power for solving this problem.

SUMMARY OF THE INVENTION

For this, the invention relates to a beverage preparation apparatus for preparing a beverage comprising:
 a water tank for storing water,
 a brewing unit for receiving a dose of beverage ingredients,
 a water line for supplying water from the water tank to the brewing unit including a pressure pump for supplying pressurized liquid to the brewing unit and a fluid heater for heating liquid,
 a control unit for selectively controlling the activation of the pressure pump,
wherein it further comprises a fluidic interrupter positionable in fluidic interruption position for interrupting the fluidic communication between the water tank and the water line and, reversely, positionable in fluidic communication position for restoring the fluid communication between the water tank and the water line. Furthermore, the control unit is preferably arranged for automatically activating an anti-freeze mode by activating the fluidic interrupter in fluidic interruption position and by running the pressure pump to at least partially empty the water line from water contained therein. More preferably, the control unit is arranged for running the pressure pump after the fluidic interrupter has been positioned in fluidic interruption position and at least substantially all water is emptied from the water line.

Therefore, a solution is thought of which provides decoupling of the water tank from the fluid circuit and provides a purging of the fluid circuit automatically. The components which can be sensitive to freezing, when the apparatus is no longer powered for an extensive period of time, are preserved. The solution is energy efficient since no heat or no long working time of electrical components is necessary.

In possible mode, the control unit is arranged for fully emptying the water line.

In an aspect, the fluidic interrupter is driven by an electrical motor controllable by the control unit between the fluidic interruption position and a fluidic communication position. A motor of low power consumption can be used thereby contributing to provide an energy efficient and an automated solution.

In an aspect, the apparatus comprises a fluidic metering device in the water line for providing to the control unit information indicative of the flow rate of liquid in the water line and the control unit is arranged for stopping the pressure pump after the flow rate falls below a predetermined threshold, preferably at zero (+/−1.0) ml/min. Preferably, the control unit is preferably arranged for delaying of a predetermined time (e.g., 2-3 seconds) the interruption of the pressure pump after the flow rate falls below a predetermined threshold to ensure the water line downstream the flow meter has had time to empty. Therefore, the removal of the water in the water line can be controlled precisely and be stopped e.g. when no significant flow can be measured. Depending on the type of pump, the formation of damage by ice is prevented by removing sufficient water from the water line while possibly maintaining sufficient the priming of the pressure pump when the flow is resumed in working conditions.

In another aspect, the control unit is arranged for receiving information related to a power status of an external electrical power circuit and for activating the anti-freeze mode as a response to such information, such as in response to an information indicating that the status of a vehicle's electrical power circuit is no longer under power. Therefore, the anti-freeze mode can, for example, be implemented when the vehicle, the beverage apparatus is installed in, is parked. The status on the low voltage power circuit of the vehicle provides an indication to the beverage preparation apparatus that the vehicle is no longer maintainable in tempered temperature conditions by the heat system of the vehicle and a freezing risk may occur. The beverage preparation apparatus may comprise an autonomous electrical energy accumulator (e.g., electrical battery) enabling to implement the mode in full autonomy, i.e. without requiring electrical power from the vehicle itself. The anti-freeze mode can be delayed from the time the information is received by the control unit on the status of the external power circuit.

In addition or alternatively, the control unit is arranged for receiving information as to a temperature indication from at least one temperature sensor sensing ambient air or liquid and for activating the anti-freeze mode as a response to such temperature information, such as in response to an information indicating that the temperature of ambient air and/or liquid falls below at least one predetermined threshold. The temperature input may be used as a cumulative condition to the power input or as an alternative condition. For this the apparatus comprises at least one temperature sensor arranged for sensing the ambient temperature or the temperature of water in the water line or water tank. Alternatively or cumulatively, the control unit may be arranged for receiving information from an external temperature sensing such as one pertaining to the vehicle.

In a preferred mode, the brewing unit is openable for insertion of the dose of beverage ingredients in the brewing chamber and closable for brewing the dose of beverage ingredients in the brewing chamber, by means of a motorization unit comprising an electrical motor and wherein, in the antifreeze mode, the control unit activates the electrical motor to open the brewing unit when running the pressure pump to at least partially empty the brewing chamber from water contained therein. The solution for emptying at least partially water from the water line is simple and does not require additional components or derivations. Water can be collected directly in a reservoir for collecting the used dose of ingredients.

In the preferred mode, the apparatus comprises an electrical accumulator arranged for supplying low-voltage electrical current to the fluidic interrupter, the activation motor of the brewing unit, the pressure pump, the control unit and optionally a water heater.

Preferably, the water tank and the water line are removably and fluidically connectable via a coupling comprising a first coupling part at an outlet of the water tank and a second coupling part at an inlet of the water line. The fluidic interrupter is arranged for separating such coupling parts for interrupting the fluid communication and for re-engaging the coupling parts for restoring the fluid communication. By separating the water tank from the water line, the water line is automatically vented and easy to purge. There is also no risk that water from the water tank can be transferred to the water line after purging of the water line.

Furthermore, the first coupling part may comprise a one-way valve. The second coupling part may comprise an opening member for opening the one-way valve during engagement. The one-way valve may be associated with elastic return means for closing the outlet of the water tank when the fluidic interrupter is in fluidic interruption position. The coupling between the water tank and the interrupter is therefore mechanically simple and enables an automatic and immediate closing of the water tank when the coupling is separated for fluidic interruption by the interrupter.

In the still preferred mode, the fluidic interrupter comprises an activation member connected, via a transmission, to the electrical motor for moving the second coupling part relative to the first coupling part between the fluidic interruption position and the fluidic communication position. In the particular mode, the activation member is arranged to be moved along an axial direction relative to outlet of the water tank such as by comprising a thread linking with a geared wheel of the transmission. The activation member so moves helicoidally along the axial direction. The activation member is arranged in connection with the second coupling to pull coupling part towards the fluidic interruption position and push it towards the fluidic communication position. The activation members may be arranged differently with the second coupling part such as by moving rotationally or curvedly.

In more general aspect, the water tank comprises a bottom wall and a plurality of side walls; such side walls forming an angle relative to the bottom wall comprised between 91 and 100 degrees, preferably between 92 and 95 degrees. The slight flaring of the side walls combined with the removability of the water tank facilitate the removal of ice that may form in the water tank.

The water tank may also be thermally insulated. In particular, the water tank comprises double-glazed sidewalls with an inner air or gas layer. The water tank is preferably closed by a top lid affixed thereon. The lid may be arranged for closing with the side walls of the water tank in a liquid tight manner. As a result, spillage of water is prevented when the vehicle is moving or parked on a steep slope.

Preferably, the lid comprises a pressure-relief valve arranged for allowing fluid to escape the water tank above a certain internal pressure applied thereon. The pressure-relief valve enables fluid to escape as water expands when transforming into ice within the water tank. The pressure-relief valve can be any kind of one-way valve such as a slit valve, a duck-bill or ball-type valve. In a preferred mode, the valve is a slit valve such as made of silicone, EPDM or TPE.

The invention may also relate to the vehicle comprising the beverage preparation apparatus.

DETAILED DESCRIPTION OF THE DRAWINGS

Figure 1:
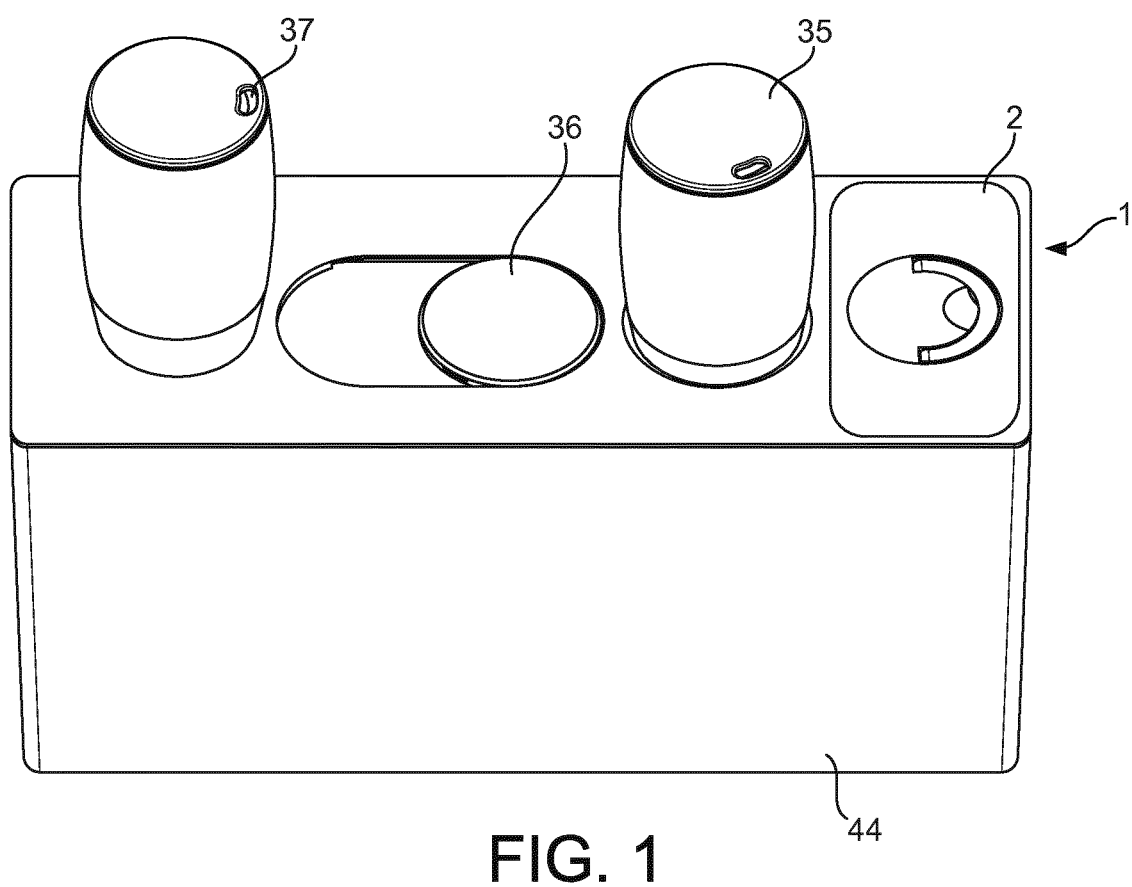
FIG. 1 shows a schematic external representation of the apparatus of the invention.
Figure 2:
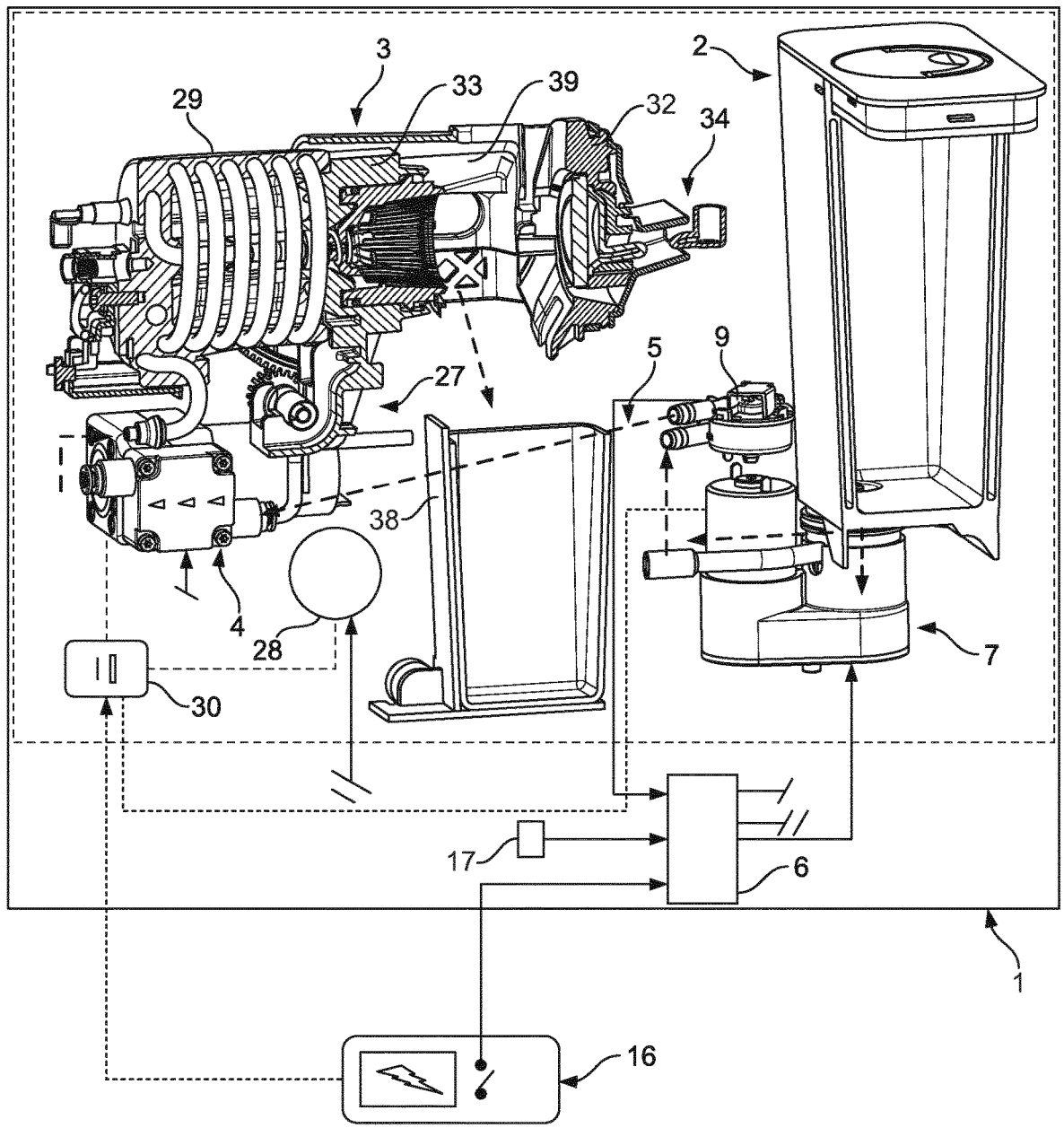
FIG. 2 shows a schematic internal representation of a part of the apparatus of the invention.

FIGS. 1 and 2 illustrate a beverage preparation apparatus 1 of the invention that may be used under low voltage in a vehicle.

The apparatus may comprise a brewing unit 3 which is adapted to receive a dose of beverage ingredients. The dose may be capsule or pod or any other suitable prepacked or refilled container. The dose of ingredients may be a single-serve for one beverage or multi-serve for more than one beverage.

The capsule is generally receivable in a brewing chamber of the brewing unit that may open and close about the dose to form in closing configuration a liquid tight engagement for ensuring that liquid injected in the chamber traverses the dose of ingredients.

The beverage apparatus comprises a pressure pump 4 arranged in the water line 5 of the apparatus to supply liquid to the brewing unit 3, more particularly to its brewing chamber. The pressure pump can be any suitable pump such as a piston pump, a gear pump, a syringe pump or a diaphragm pump.

Liquid is supplied to the pump from a liquid supply such as a water tank 2. The water tank is preferably removably connectable to a first end of the liquid line 5 via a coupling 10 and a fluidic interrupter 7 that is further detailed below.

Liquid can be heated in the beverage apparatus by at least one fluid heater 29. The fluid heater is arranged to heat liquid supplied under pressure by the pressure pump 4 before it enters the brewing chamber. The fluid heater can be part of the brewing unit (as illustrated) or be a separated part thereof.

Beverage is prepared in the brewing chamber by interaction of the beverage ingredients and supplied liquid in controlled amount.

The brewing unit may more particularly comprise an outlet part 32 and a water injection part 33. The liquid injection part 33 is connected to the water line 5, pump and heater. The outlet part 33 is connected to beverage dispensing means 34 arranged for guiding beverage to a beverage receptacle 35 (FIG. 1). For example, beverage can be filled to the receptacle via a beverage injector from below as described in WO2014086915. For example, the beverage injector and receptacle are complementarily configured to enable the dispensing of the beverage through the bottom of the cup.

For example, the beverage apparatus comprises an external casing 44 comprising the components of the apparatus. The casing 44 may comprise a top surface with the water tank 2, the receptacle 35 in engagement with the beverage injector and a gate 36 for the introduction of a dose of beverage ingredients in the brewing unit. An additional receptacle 37, e.g. of different size, may be provided for preparing a different beverage by the apparatus. The apparatus may be integrated in a dedicated cabinet of a vehicle such as in or close to a central armrest of the vehicle. Interestingly, the top surface of the apparatus remains accessible to the user for preparation.

The control of the beverage preparation apparatus is obtained by a control unit 6 that receives input from components of the apparatus and provides output to components of the apparatus. In particular, a flow metering device such as a flow meter 9 may be provided in the water line to provide information indicative of the flow rate and/or of the volume of liquid supplied to the brewing unit by the pressure pump. The flow and/or pressure of the liquid in the fluid circuit may additionally or alternatively be determined by information provided by the pressure pump 4 to the control unit 6 such as for example, the absorbed electrical current measured at the pump. A temperature sensor 17 may also be provided to provide input indicative of the ambient temperature in the beverage apparatus 1 or in the vehicle. Alternatively or in addition, a temperature sensor 17 can also be positioned to sense the temperature of the water in the water line 5 or in the water tank 2.

The outlet part 32 and the water injection part 33 of the brewing unit may be moved relative to each other between an open (dose insertion) position and a closed (brewing) position by a motorization unit 27. The motorization unit may comprise a low power electrical motor 28 and a transmission. A possible example of a brewing unit comprising an adequate motorized unit is such as described in WO 2012/025259. The two parts 32, 33 are generally moved away relative to each other, e.g. linearly, into the opening position to form a passage for inserting the dose in the brewing unit and for removing the dose from the brewing unit after brewing. The dose may be removed by gravity fall into a collecting reservoir 38. As will be described, such reservoir may also advantageously be used for collecting the water when purged from the water line.

The dose introduction gate 36 of the apparatus may be driven by the liquid injection part 33 and be associated with a passage 39 and movable between a position opening the passage and a position closing the passage such as described in WO2012/072766. In particular, the gate 36 may be connected to the movable part 33 by an intermediate mechanical conversion mechanism for converting movements of the movable part into movements of the gate (not illustrated).

The beverage preparation apparatus preferably comprises an electrical low-voltage power supply means 30 which is arranged for supplying the main electrical and electronic components of the apparatus, in particular, water pump 4, the control unit 6, fluidic interrupter 7, motorization unit 27, the water heater 29 and possibly additional components such as user interface and/or lightening etc. The electrical low-voltage power supply means may be a rechargeable accumulator 30. The accumulator may be connectable to an external low voltage power circuit 16, preferably, the one of the vehicle.

The apparatus may also comprise energy management means in the control unit or elsewhere to manage the electrical power supply to at least certain components as function of the status of the external power circuit. In particular, the control unit may be arranged to receive input from the external power circuit 16 as to its power status.

For example, when the power of the external power circuit is off, e.g., the vehicle's key is removed or on a "zero" (or ready) position, the control unit receives input from the external power circuit indicative of such "off power" status. In response the energy management means may instruct the accumulator 30 to supply electrical power to the apparatus in an autonomous manner. When the power of the external power circuit is on, vehicle's key on board battery mode or in alternator supply mode, the control unit receives input from the external power circuit indicative of such "on power" status. In response the energy management means may instruct the accumulator to charge. In such mode, the components of the apparatus may remain powered in low-voltage power by the electrical accumulator 30 or directly by the external electrical circuit 16.

According to an important aspect of the invention, the beverage preparation apparatus is arranged for automatically activating an anti-freeze procedure or mode by activating the fluidic interrupter 7 in fluidic interruption position.

Figure 3:
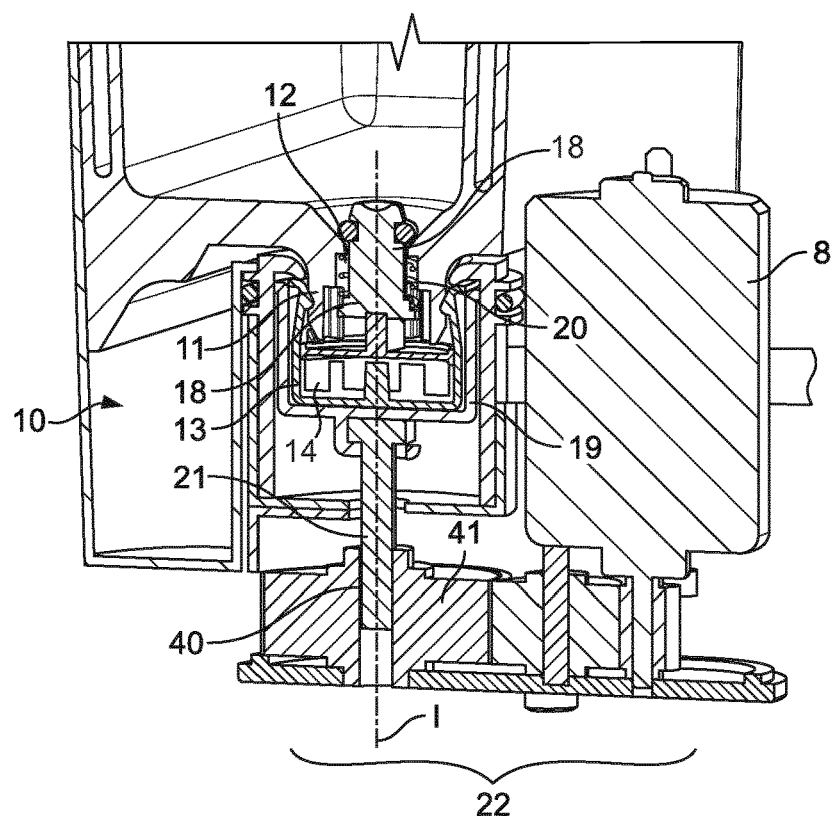
FIG. 3 shows a detail of the fluidic interrupter in fluid communication position.
Figure 4:
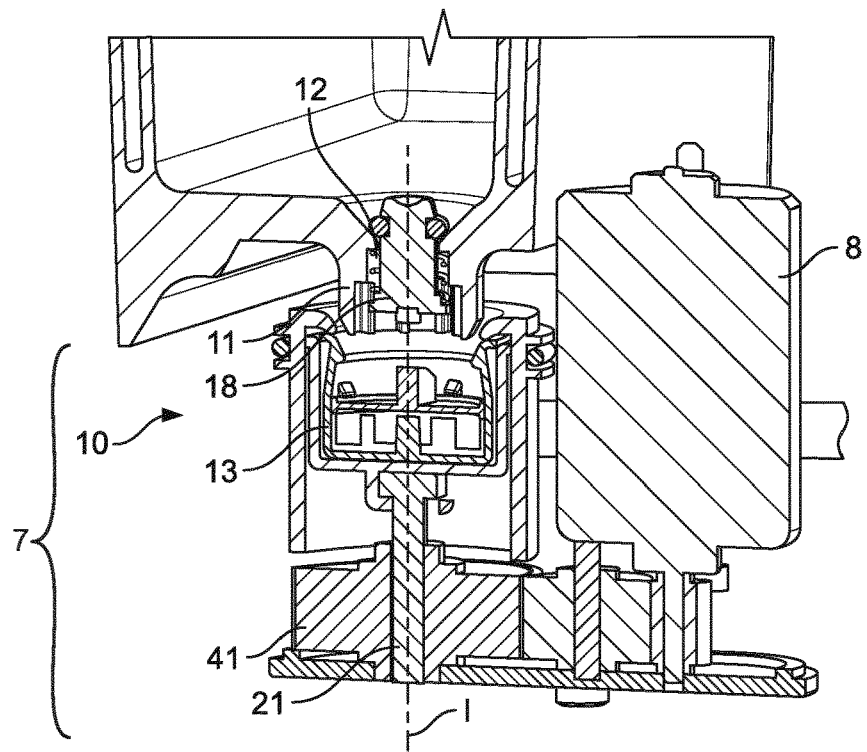
FIG. 4 shows a detail of the fluidic interrupter in fluid interruption position.
Figure 5:
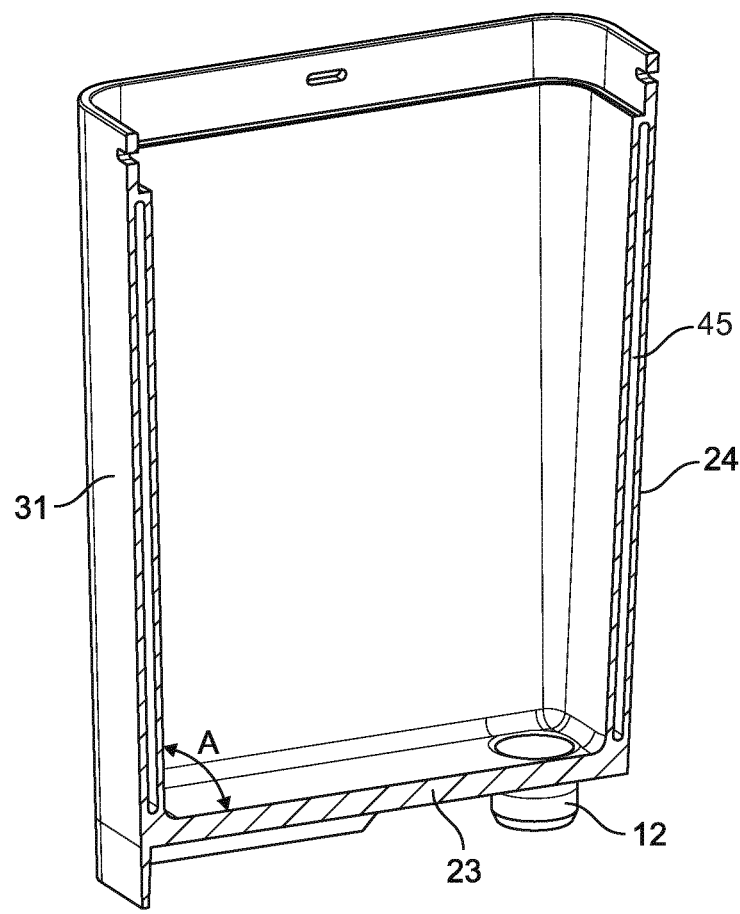
FIG. 5 shows a cross-section of part of the water tank.
Figure 6:
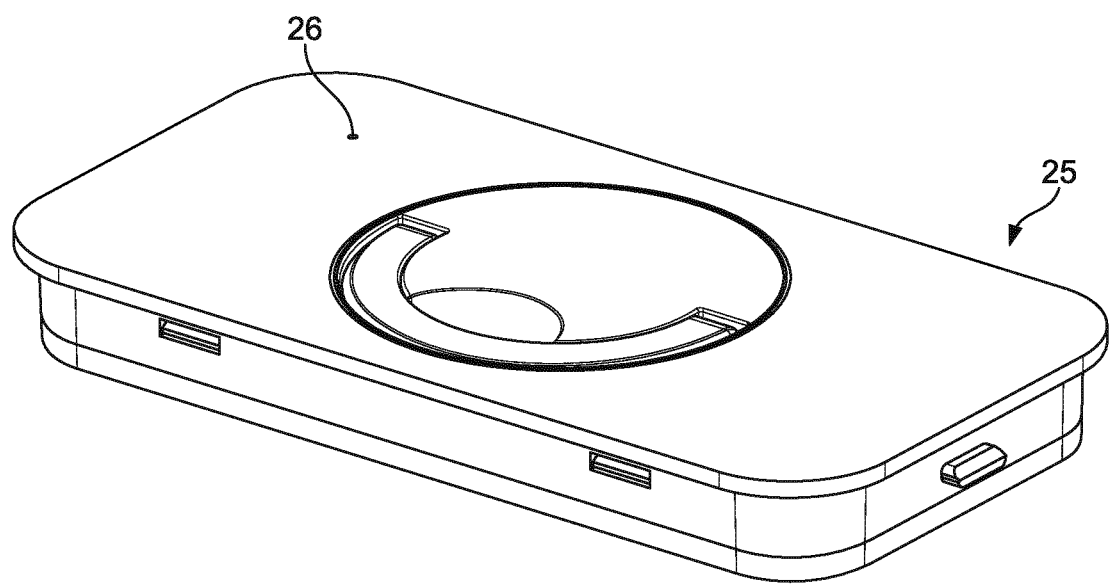
FIG. 6 show a top perspective view of the lid of the water tank.
Figure 7:
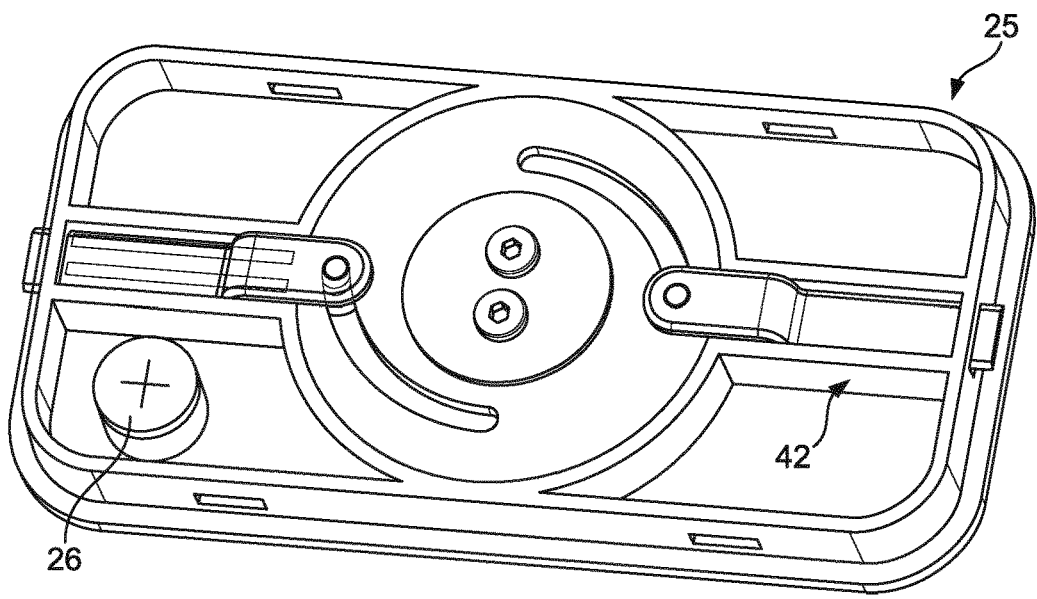
FIG. 7 shows a bottom perspective of the lid of the water tank.
Figure 8:
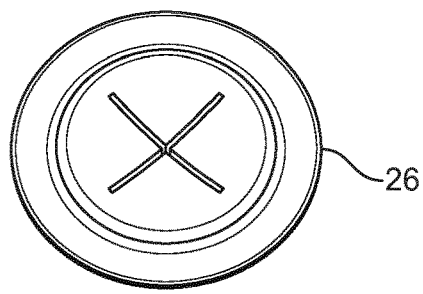
FIG. 8 shows an example of a slit valve for the lid.
Figure 9:
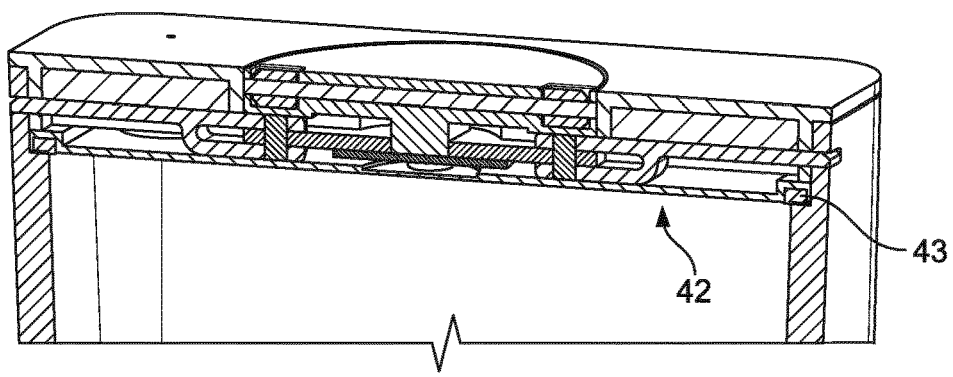
FIG. 9 shows a cross-sectional view of the water tank with the closed lid.

An example of fluidic interrupter is illustrated in relation to FIG. 3 (fluidic communication position) and FIG. 4 (fluidic interruption position). The fluidic interrupter is driven between the two positions by a, preferably low voltage, electrical motor 8 controllable by the control unit 6. The water tank 2 and water line 5 are removably coupled via a fluidic coupling 10. The fluidic coupling may comprise a first coupling part 11 at an outlet 12 of the water tank and a second coupling part 13 at an inlet 14 of the water line. The fluidic interrupter is arranged from separating such coupling parts 11, 13, preferably in the axial direction (I) of the inlet and outlet.

For example, the first coupling part 11, for example tubular-shaped, in the water tank comprises a one-way valve 18 which is engaged in closure in the outlet 12 under the force of an elastic return means such as an helical spring 20. The first coupling part can be guided in engagement with the second coupling part by an external guiding frame. The guiding engagement enables the water tank to be removed by simple pulling force (e.g. via the top handle). In the fluidic interruption position or when the water tank is removed from the apparatus, the valve closes the water outlet such that no water leak is allowed outside of the tank. The second coupling part 13 can be slidably mounted to a housing so that it can be guided axially. The second coupling part 13 comprises an opening member 19 which is arranged axially for engaging the valve 18 and opening it as illustrated in FIG. 3. The opening member 19 can be a small male part which pushes the valve of the tank inwardly under the force of the elastic return means. In this position, the valve is disengaged and opened thereby leaving a passage for water to communicate between the water tank and the water line.

The fluidic interrupter further comprises an activation member 21 connecting to the second coupling part 13 to move it between the two positions. The activation member may be, for example, an axially elongated member connected to the motor 8 via a transmission 22. The transmission may comprise a series of geared wheels or pinions or other suitable transmission means (e.g. a belt and pulleys). The activation member 21 may comprise a thread 40 connected to the end geared wheel 41 of the transmission for moving the activation member in the central axis of the end wheel in alignment of the axis (I). As a result of the axial reciprocating movement of the activation member 21 by the motor under the control of the control unit, the second coupling part 13 can be moved relative to the first coupling part 11 between the two positions of the fluidic interrupter.

An example of the body 31 of the water tank is illustrated. The body may comprise a bottom wall 23, from which the outlet 12 preferably extends, and side walls 24. For facilitating the removal of an ice block from the water tank, the side walls may preferably form an angle A relative to bottom wall which is greater than 90 degrees. Preferably, the angle A is comprised between 91 and 100 degrees, most preferably between 92 and 95 degrees.

For thermal insulation, the side wall 24 of the water tank may advantageously be formed of a double-wall structure with a gas or foam inner layer 45. The bottom wall may also comprise a similar structure. Advantageously, the bottom and side walls are formed of a single piece made of polymer.

The body of the water tank is preferably closed by a lid 25 which is preferably secured to the body by latch means 42. Seal means 43 such as a rubber gasket may be provided to the lid and/or body to assure a liquid-tight closing of the lid. The advantage for usage in a vehicle is that it avoids the spillage of water out of the tank when the vehicle runs. However, it may be advantageous to have a pressure-relief valve 26 arranged in the lid to allow fluid to escape above a certain pressure building in the water tank. The valve can be configured to allow escape of fluid only under the pressure exerted by a large block of ice on the valve but to prevent escape of water under low pressure to avoid water spillage out of the tank when the vehicle is running.

Figure 10:
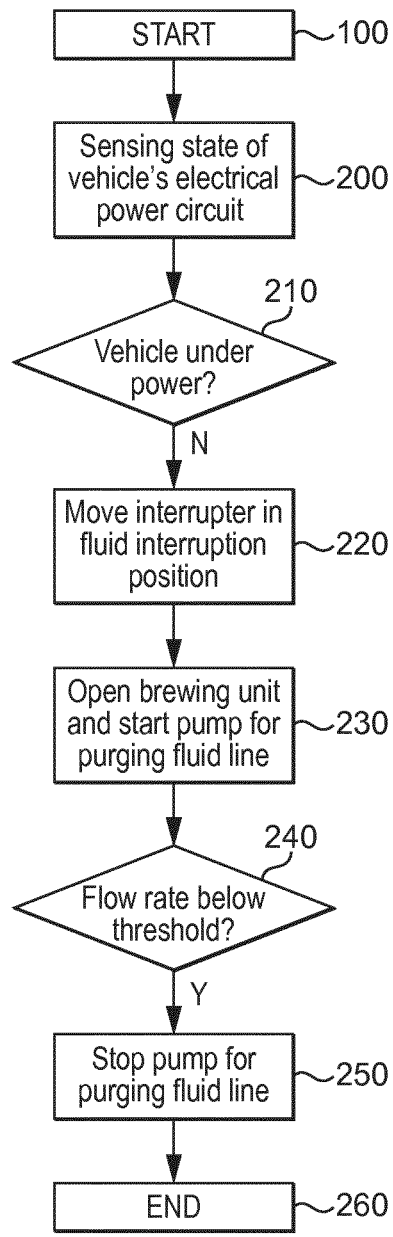
FIG. 10 is an example of flow chart for the control of the anti-freeze procedure.

FIG. 10 illustrates a control scheme of the anti-freeze procedure implementable in the beverage preparation apparatus under the control of the control unit 6. The anti-freeze procedure may be a routine control program embedded in the memory of the control unit and may start automatically in a start step 100. In step 200, the control unit 6 receives input from the external power circuit 16 of the vehicle as to the status of the power circuit. A test 210 can routinely be implemented by the control unit, such as by energy management means, for detecting if the power circuit of the vehicle is "on" or "off". In the event, the power circuit is "off", the control unit may automatically activate the fluidic interrupter to the fluidic interruption position in step 220. In a variant, the test 210 can also be implemented to sense one or more temperatures (ambient and/or water) by the temperature sensor(s) 17 and to activate the fluidic interrupter to the fluidic interruption position in step 220 when the sensed temperature falls below a predetermined threshold as controlled by the control unit 6. In the next step 230, the control unit may further start the water pump 4 to start purging the water line. Optionally, such operation may be preceded by opening the brewing unit 3 to ensure that water does not sit in the closed brewing chamber but is collected in collecting reservoir 38. Opening of the brewing unit may be operated by the control unit activating the motorized unit 27 such that the water injection part is moved away relative to the outlet part 32 and passage 39 for water is provided. In a next step 240, the flow rate is controlled by the control unit receiving input from the flow meter 9, such as in a closed loop fashion, and the pressure pump is stopped when information indicative of flow rate below a predetermined threshold is received by the control unit in step 250. For instance, when a flow rate below 0.5 ml/min indicates that the water line is substantially empty and/or that there is no risk of damage by ice formation in the line. The procedure is ended in step 260 and it may be reset after a beverage preparation identified as such by the control unit or a maintenance operation such as a descaling operation and the like.

NUMERICAL REFERENCES

1. Beverage preparation apparatus
2. Water tank
3. Brewing unit
4. Pressure pump
5. Water line
6. Control unit
7. Fluidic interrupter
8. Electrical motor
9. Fluidic metering device
10. Coupling
11. First coupling part
12. Outlet of water tank
13. Second coupling part
14. Inlet of water line
15. Electrical accumulator (vehicle)
16. Low-voltage power circuit (vehicle)
17. Temperature sensor
18. One-way valve
19. Opening member
20. Elastic return means
21. Activation member
22. Transmission
23. Bottom wall
24. Side walls
25. Lid
26. Pressure-relief valve
27. Motorization unit
28. Electrical motor
29. Fluid heater
30. Electrical accumulator
31. Body of water tank
32. Outlet part
33. Water injection part
34. Beverage dispensing means
35. Beverage receptacle
36. Gate
37. Additional receptacle 38. Collection reservoir
39. Passage
40. Thread
41. Gear wheel
42. Latch means
43. Seal means
44. Casing
45. Foam inner layer

The invention claimed is:

1. A beverage preparation apparatus for preparing a beverage comprising:
   a water tank for storing water;
   a brewing unit for receiving a dose of beverage ingredients;
   a water line for supplying water from the water tank to the brewing unit including a pressure pump for supplying pressurized liquid to the brewing unit and a fluid heater for heating liquid;
   a control unit for selectively controlling the activation of the pressure pump;
   a fluidic interrupter positionable in fluidic interruption position for interrupting the fluidic communication between the water tank and the water line and, reversely, positionable in fluidic communication position for restoring the fluid communication between the water tank and the water line; and
   the control unit is arranged for automatically activating an anti-freeze mode by activating the fluidic interrupter in fluidic interruption position and by running the pressure pump to at least partially empty the water line from water contained therein, and
   the fluidic interrupter is driven by an electrical motor controllable by the control unit between the fluidic interruption position and a fluidic communication position.

2. The beverage preparation apparatus according to claim 1, comprising a fluidic metering device in the water line for providing to the control unit information indicative of the flow rate of liquid in the water line and the control unit is arranged for stopping the pressure pump after the flow rate falls below a predetermined threshold.

3. The beverage preparation apparatus according to claim 1, wherein the control unit is arranged for receiving information related to a power status of an external electrical power circuit and for activating the anti-freeze mode as a response to such information, such as in response to an information indicating that the status of an vehicle's electrical power circuit is no longer under power.

4. The beverage preparation apparatus according to claim 1, wherein the control unit is arranged for receiving information as to a temperature indication from at least one temperature sensor sensing ambient air or liquid and for activating the anti-freeze mode as a response to such temperature information, such as in response to an information indicating that the temperature of ambient air and/or liquid falls below at least one predetermined threshold.

5. The beverage preparation apparatus according to claim 1, wherein the brewing unit is openable for insertion of the dose of beverage ingredients in brewing chamber and closable for brewing the dose of beverage ingredients in the brewing chamber, by means of a motorization unit comprising an electrical motor and wherein, in the antifreeze mode, the control unit activates the electrical motor to open the brewing unit when running the pressure pump to at least partially empty the brewing chamber from water contained therein.

6. The beverage preparation apparatus according to claim 5, comprising an electrical accumulator arranged for supplying low-voltage electrical current to the fluidic interrupter, the activation motor of the brewing unit, the pressure pump, and the control unit.

7. The beverage preparation apparatus according to claim 1, wherein the water tank and the water line are removably and fluidically connectable via a coupling comprising a first coupling part at an outlet of the water tank and a second coupling part at an inlet of the water line and the fluidic interrupter being arranged for separating such coupling parts for interrupting the fluid communication and for re-engaging the coupling parts for restoring the fluid communication.

8. The beverage preparation apparatus according to claim 7, wherein the first coupling part comprises a one-way valve and the second coupling part comprises an opening member for opening the one-way valve during engagement, the one-way valve being associated with an elastic return for closing the outlet of the water tank when the fluidic interrupter is in fluidic interruption position.

9. The beverage preparation apparatus according to claim 8, wherein the fluidic interrupter comprises an activation member connected, via a transmission, to the electrical motor for moving the second coupling part relative to the first coupling part between the fluidic interruption position and the fluidic communication position.

10. The beverage preparation apparatus according to claim 9, wherein the activation member is arranged to be moved along an axial direction relative to outlet of the water tank such as by comprising a thread linking with a geared wheel of the transmission.

11. The beverage preparation apparatus according to claim 1, wherein the water tank comprises a bottom wall and a plurality of side walls, the side walls forming an angle relative to the bottom wall comprised between 91 and 100 degrees.

12. The beverage preparation apparatus according to claim 11, wherein the water tank comprises a lid arranged for closing with the side walls of the water tank in a liquid tight manner.

13. The beverage preparation apparatus according to claim 12, wherein the lid comprises a pressure-relief valve arranged for allowing fluid to escape the water tank above a certain internal pressure applied thereon.

14. The beverage preparation apparatus according to claim 3, wherein the pressure-relief valve is a slit valve such as made of silicone, EPDM or TPE.

15. A vehicle configured to move and be parked and comprising at least one of a cabinet or an armrest, the vehicle further comprising a beverage preparation apparatus for preparing a beverage, the beverage preparation apparatus comprising a water tank for storing water, a brewing unit for receiving a dose of beverage ingredients, a water line for supplying water from the water tank to the brewing unit including a pressure pump for supplying pressurized liquid to the brewing unit and a fluid heater for heating liquid, a control unit for selectively controlling the activation of the pressure pump, a fluidic interrupter positionable in fluidic interruption position for interrupting the fluidic communication between the water tank and the water line and, reversely, positionable in fluidic communication position for restoring the fluid communication between the water tank and the water line, and the control unit is arranged for automatically activating an anti-freeze mode by activating the fluidic interrupter in fluidic interruption position and by running the pressure pump to at least partially empty the water line from water contained therein, and the fluidic interrupter is driven by an electrical motor controllable by the control unit between the fluidic interruption position and a fluidic communication position.

16. The vehicle of claim 15, wherein the vehicle is a car.

* * * * *